United States Patent [19]

Stefansky

[11] Patent Number: 5,621,582

[45] Date of Patent: Apr. 15, 1997

[54] DISK DRIVE INCLUDING A BASEPLATE WELL FOR THE SPIN MOTOR

[75] Inventor: Frederick M. Stefansky, Longmont, Colo.

[73] Assignee: Conner Peripherals, Inc., San Jose, Calif.

[21] Appl. No.: 153,784

[22] Filed: Nov. 17, 1993

Related U.S. Application Data

[63] Continuation of Ser. No. 1,891, Jan. 7, 1993, abandoned, which is a continuation of Ser. No. 549,283, Jul. 6, 1990, abandoned, which is a continuation-in-part of Ser. No. 147,804, Jan. 25, 1988, Pat. No. 4,965,684.

[51] Int. Cl.$^6$ .................................................. G11B 5/55
[52] U.S. Cl. ..................... 360/75; 360/98.01; 360/98.07; 360/903
[58] Field of Search .................... 360/77.02, 78.04, 360/78.12, 97.01–98.02, 98.07, 99.01, 99.04, 99.08, 99.11, 104, 105, 900, 903, 75; 364/708; 369/75.1, 75.2, 36, 76–77.2

[56] References Cited

U.S. PATENT DOCUMENTS

| | | | |
|---|---|---|---|
| 4,367,503 | 1/1983 | Treseder . | |
| 4,638,383 | 1/1987 | McGinlay et al. | 360/77.02 |
| 4,639,863 | 1/1987 | Harrison et al. | 364/708 |
| 4,654,735 | 3/1987 | Izraelev et al. | 360/104 |
| 4,724,499 | 2/1988 | Bratvold et al. | 360/98.01 |
| 4,772,974 | 9/1988 | Moon et al. | 360/78.04 |
| 4,814,913 | 3/1989 | Mihara et al. | 360/98.07 |
| 4,890,174 | 12/1989 | Chalmers et al. | 360/98.07 |
| 4,933,785 | 6/1990 | Morehouse et al. | 360/78.04 |
| 5,060,100 | 10/1991 | Mihara et al. | 360/98.01 |

FOREIGN PATENT DOCUMENTS

| | | |
|---|---|---|
| 0186380 | 7/1986 | European Pat. Off. . |
| 59-72680 | 4/1984 | Japan . |
| 63-211182 | 9/1988 | Japan . |

OTHER PUBLICATIONS

Electronic Engineering Times "Winchester Disk Drives" Feb. 25, 1985, Clemens, pp. 53, 56, 58–60, 62–64.

Plus Development Corporation "Hardcard—the easy-to-use 10 megabyte hard disk drive on a plug-in card", 1985.

Alps brochure "3.5-inch Hard Disk Drive", Alps Electric (USA), Inc. 1987.

1987 ALps Show New Product Guide "3.5-inch Rigid Disk Drive model DRM020D" 1987.

Article entitled Wang Announces Its Long-Awaited Laptop Computer, InfoWorld, Oct. 20, 1986.

Article entitled The Wang LapTop, Byte, Oct., 1987.

Primary Examiner—Paul P. Gordon
Assistant Examiner—Steven R. Garland
Attorney, Agent, or Firm—Fliesler, Dubb, Meyer & Lovejoy

[57] ABSTRACT

A low height disk drive having an overall height of approximately one inch (1"). The drive includes a head disk assembly, including a base plate, two disks rotatably supported on the base plate, a motor for rotating the disks, at least two heads for reading information from and writing information on respective ones of the disks, an actuator, supported on said base plate and responsive to control signals, for selectively positioning the heads with respect to the disks, and a cover sealably attached to the base plate to enclose the storage means, the head, and the actuator. The disk drive also includes control circuitry for generating control signals, and for providing information signals to and receiving information signals from the heads. The head disk assembly and the control circuitry have a combined height of approximately one inch or less.

1 Claim, 10 Drawing Sheets

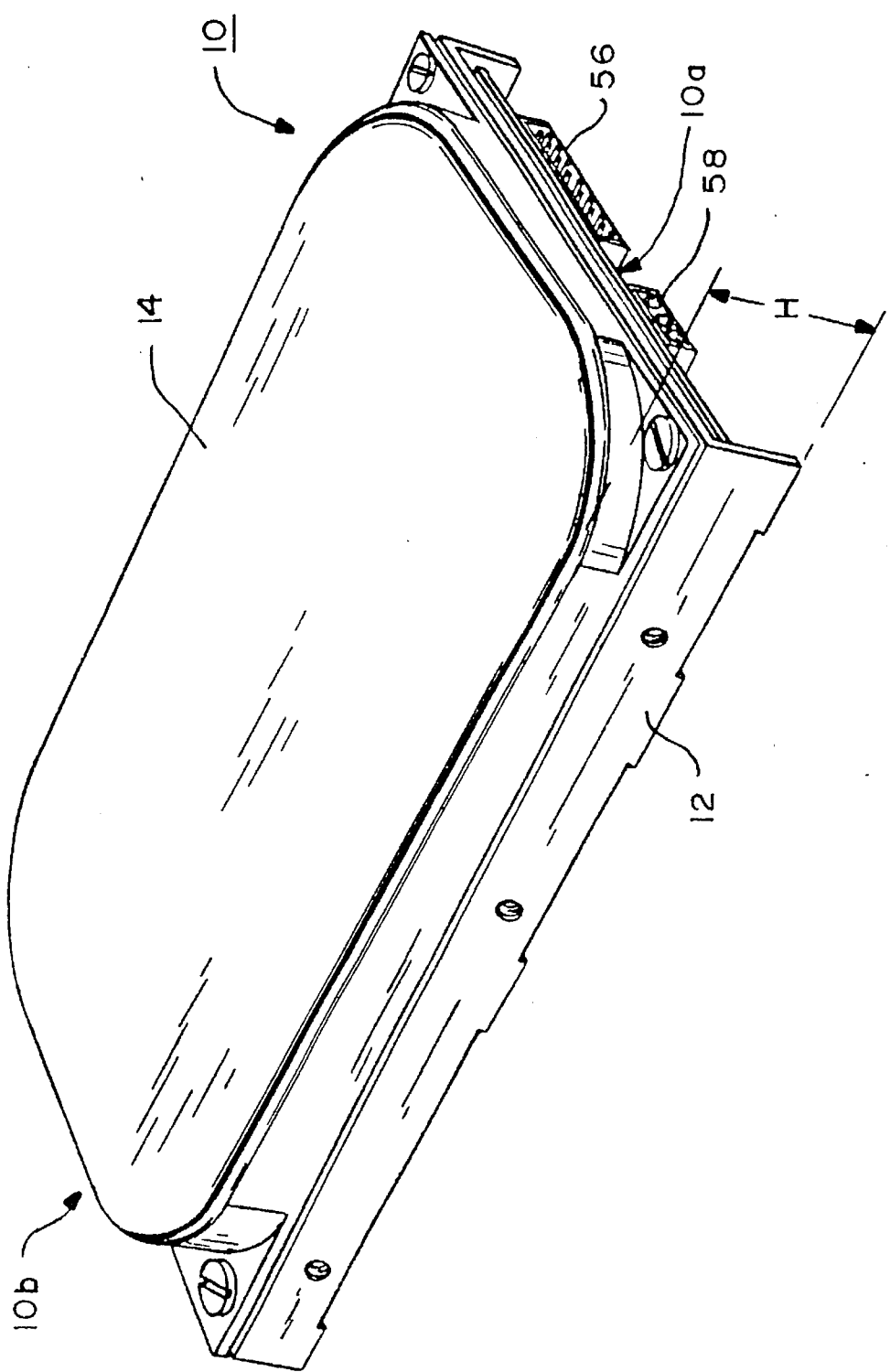
FIG.—1

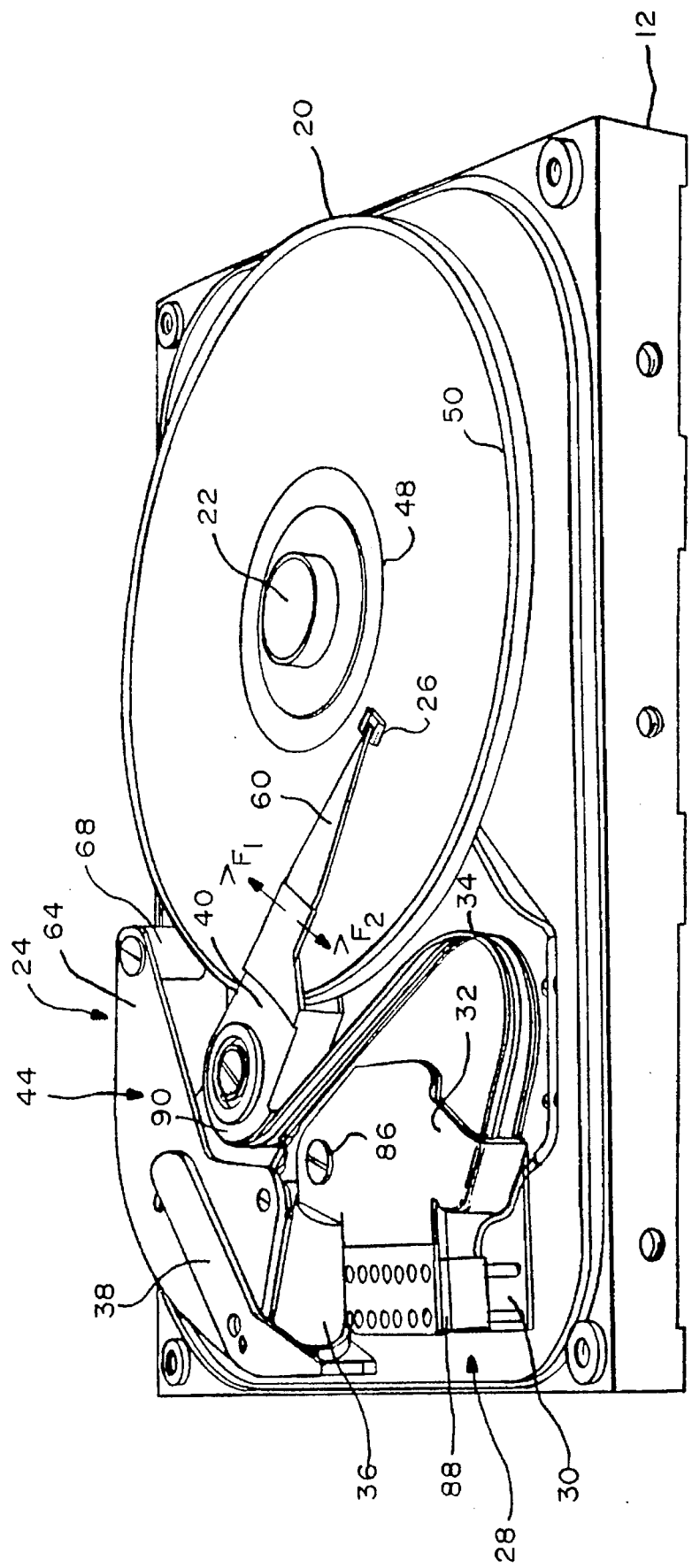
FIG.—2

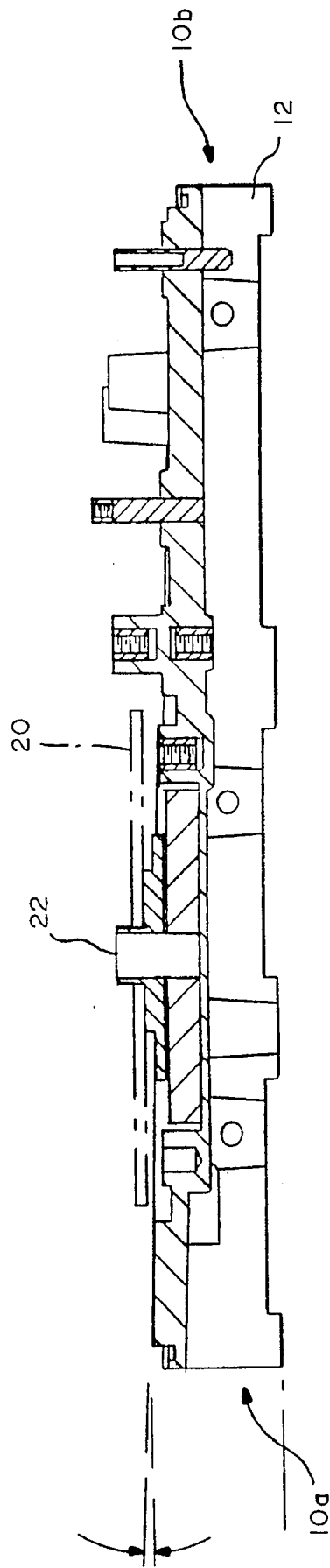
FIG.—3
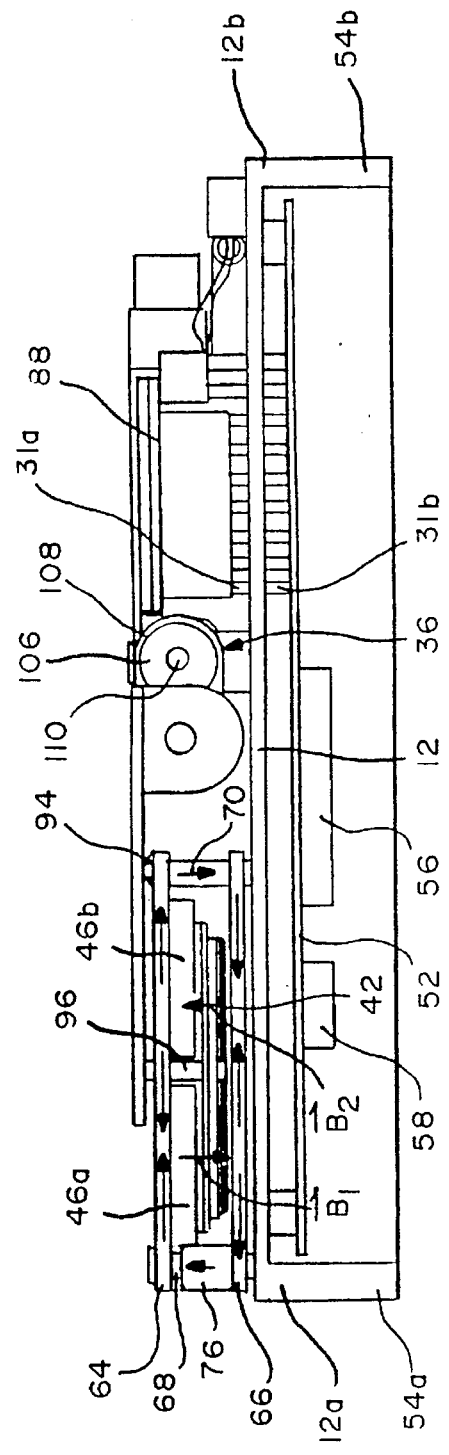
FIG.—5

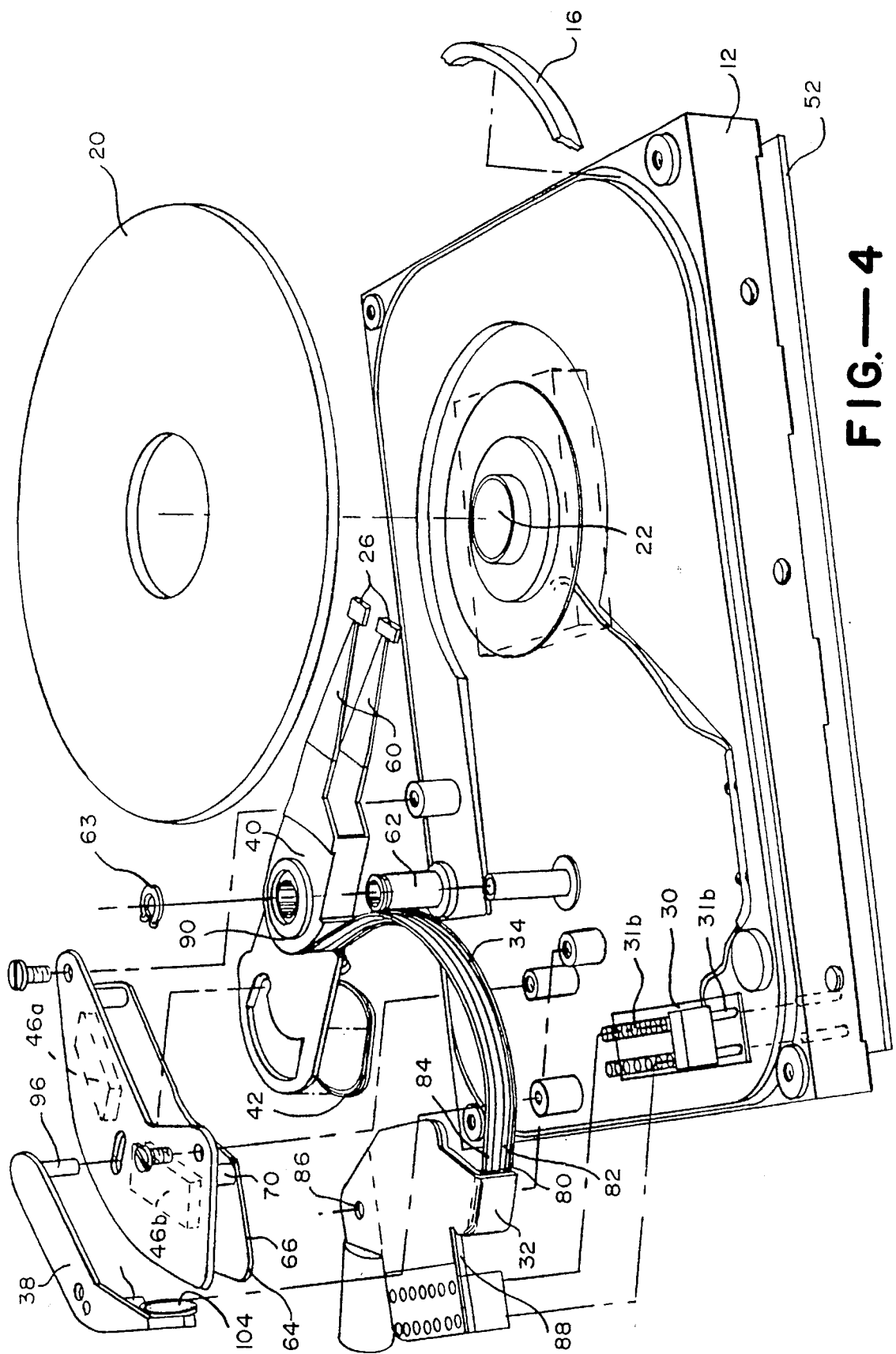
FIG.—4

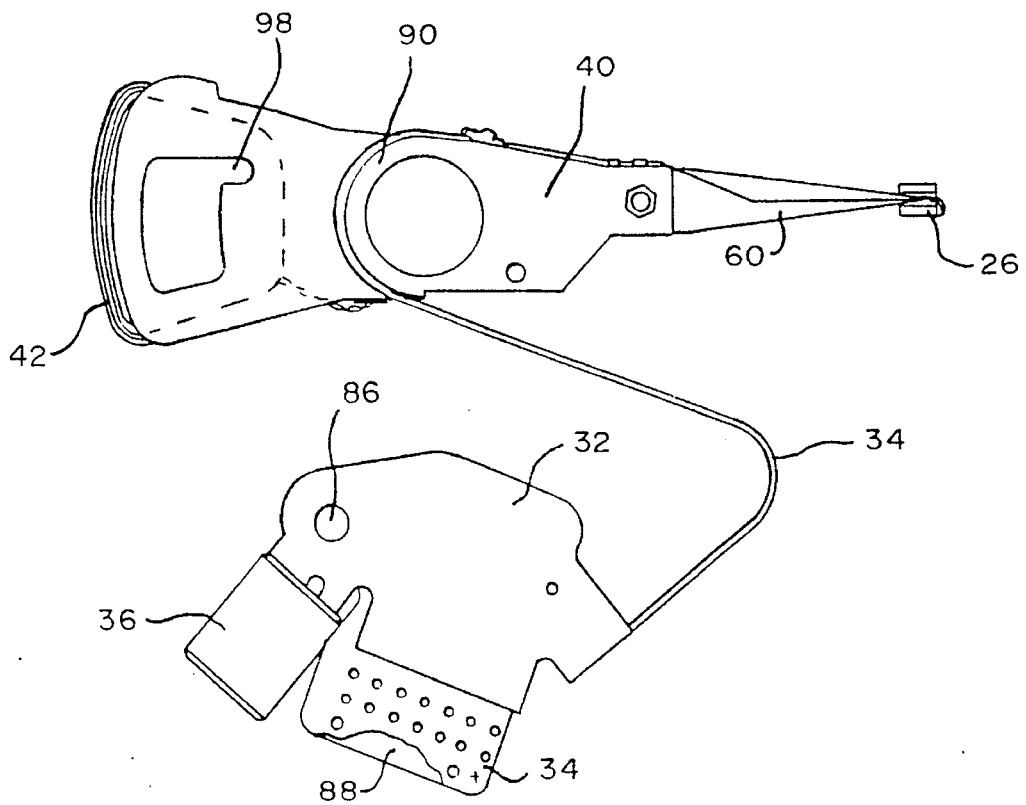
FIG.—6
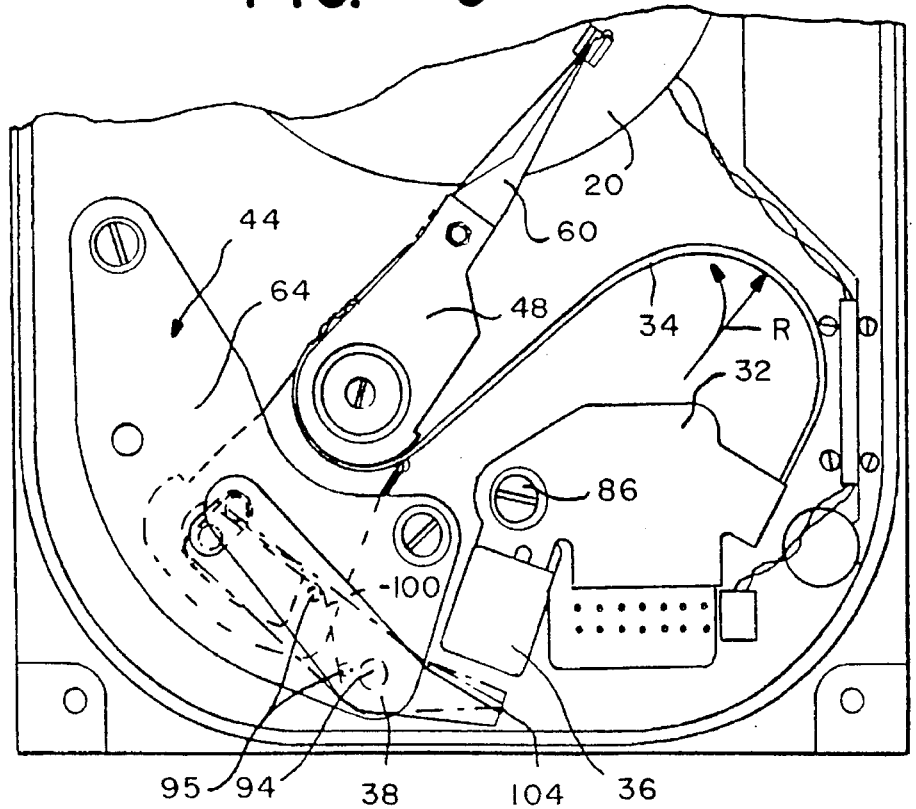
FIG.—7

DISK DRIVE INCLUDING A BASEPLATE WELL FOR THE SPIN MOTOR

CROSS REFERENCE TO RELATED APPLICATIONS

This application is File Wrapper Continuation of Ser. No. 08/001,891, filed Jan. 7, 1993, now abandoned, which is a continuation of Ser. No. 07/549,283 filed Jul. 6, 1990, now abandoned, which is a continuation-in-part of Ser. No. 07/147,804, filed Jan. 25, 1988, now U.S. Pat. No. 4,965,684.

1) DISK DRIVE SYSTEM CONTROLLER ARCHITECTURE, inventors John P. Squires, Tom A. Fiers, and Louis J. Shrinkle, Ser. No. 057,289, filed Jun. 2, 1987, now U.S. Pat. No. 4,979,056;

2) DISK DRIVE SOFTWARE SYSTEM ARCHITECTURE, inventors John P. Squires, Tom A. Fiers, and Louis J. Shrinkle, Ser. No. 488,386, filed Feb. 23, 1990, which is a continuation of Ser. No. 057,806, filed Jun. 2, 1987, now abandoned;

3) DISK DRIVE SYSTEM CONTROL ARCHITECTURE UTILIZING EMBEDDED REAL-TIME DIAGNOSTIC MONITOR, inventor John P. Squires, Ser. No. 423,719, filed Oct. 18, 1989, now U.S. Pat. No. 4,979,055, which is a continuation of Ser. No. 058,289, filed Jun. 2, 1987, now abandoned;

4) LOW-POWER HARD DISK DRIVE ARCHITECTURE, inventors John P. Squires and Louis J. Shrinkle, filed Aug. 7, 1990, Ser. No. 564,693, which is a continuation of Ser. No. 152,069, filed Feb. 4, 1988, now abandoned;

5) DISK DRIVE SYSTEM USING MULTIPLE EMBEDDED QUADRATURE SERVO FIELDS, inventors Louis J. Shrinkle and John P. Squires, Ser. No. 386,504, filed Jul. 27, 1989, now abandoned;

6) MAGNETIC PARKING DEVICE FOR DISK DRIVE, inventor, Frederick Mark Stefansky, Ser. No. 643,703, filed Jan. 22, 1991, which is a continuation of Ser. No. 269,873, filed Nov. 10, 1988, now abandoned.

Each of these related Applications is assigned to the assignee of the subject Application and hereby incorporated by reference.

BACKGROUND OF THE INVENTION

1. Field of the Invention

The present invention relates to disk drives; more particularly, to hard (or fixed) disk drives.

2. Description of the Related Art

Developments in personal computers, portable computers and lap top computers have prompted reductions in the size and increases in memory capacity of disk drives. Attempts to provide further reductions in the size and weight, and increases in durability and memory capacity of existing disk drives have been met with limited success. The size (particularly the height) and weight of fixed or hard disk drives and the inability of existing hard disk drives to withstand physical shocks and/or vibrations have been factors which have prevented the incorporation of fixed disks in lap-top and in some cases even larger portable computers.

Existing disk drives incorporate a large number of mechanical parts. Each part in a disk drive also represents an increase in the weight of the drive and the space occupied by the drive. A large number of mechanical components makes manufacturing difficult and expensive and increases the possibility and probability of the mechanical failure of the drive. Importantly, the number of mechanical components is related to the ability of the drive to survive physical shocks and vibrations.

Resistance to physical shocks and vibrations is critical to protecting the disk or disks, the head or heads, and the various bearings in a disk drive from damage; in particular, it is necessary to prevent damage to the disks which can cause a loss of data, and damage to the heads or the bearings which can end the life of a drive, resulting in a total loss of data. Prior disk drives, however, have limited resistance to physical shocks. Resistance to physical shocks is of paramount importance in portable computers.

In conventional drives mechanical distortion or flexing of the mechanical components of a disk drive which support the heads and disks causes tracking problems by moving the heads, which are mounted at one point on the supporting components, relative to the disk, which is mounted at another point on the supporting components. The heads associated with the top and bottom surfaces of a disk can move relative to the disk to the point where the different heads are in different cylinders—a cylinder being defined as a vertical segment representing the same track on the top and bottom surfaces of a disk. This problem is known as mechanical off-track. This problem is compounded by increased track densities.

Another problem with prior disk drives is the difficulty in sealing the drive to protect the disks from contaminants. This difficulty arises in part, from the large number of points at which access is provided to the environment in which the disk resides. These access points are utilized to bring to the interior of the disk drive electrical circuits which provide current to the motor which rotates the disk, transmit data signals to and from heads which read and record information on the disks, and in some instances, provide current to a voice coil for positioning the head (or heads) with respect to the disk or disks.

Many of these disadvantages of prior disk drives are attributable to the casing—a three-dimensional casting or so-called "toilet bowl"—in which the disks reside. Such a casing is a large, three dimensional piece of cast metal, usually aluminum, having a round portion where the disks reside—hence the name "toilet bowl." A top plate covers the entire open top of the casing, forming a seal therewith. The spindle on which the disks rotate is supported by and extends through both the casing and the cover.

The protrusion of the spindle through the casing and the cover provides possible points of entry for contaminants. Further, in disk drives using stepper motors to position the heads with respect to the disk, the stepper motor is located outside of the casing, requiring a seal between the stepper motor and the casing. Acknowledging the existence of points where contaminants can enter the disk drive, manufacturers of conventional disk drives provide a breather filter and design the disk drives so that the rotation of the disks causes the disk drives to exhaust air through leaks in the seals and to intake air only through the breather filter. However, a fairly course filter must be provided in the breather filter for a flow of air to exist, and thus contaminants enter the disk drive through the filter paper.

A cast casing is difficult to manufacture with precision, particularly the location of mounting points for elements of the drive supported by the casing. Mounting holes must be drilled after the casing is cast, and the mounting holes must be aligned with the casing and with each other. More importantly, however, a three-dimensional, cast casing flexes due to thermal stresses causing the above-mentioned mechanical off-track problems.

In conventional disk drives which use a voice coil to pivot an actuator arm in order to position the heads with respect to the disk, a flex circuit, having one end attached to the actuator arm and the other end attached to a fixed point in the disk drive, transfers the information signals to and from the heads. The standard orientation of such a flex circuit is a loop extending away from the disk. The distance between the point at which the flex circuit is attached to the actuator and the end of the disk drive is limited, and thus the radius of the arc or curve of the flex circuit is small and the length of the flex circuit itself is limited. Therefore, the entire flex circuit moves when the actuator arm is pivoted and a torque is exerted on the actuator arm by the flex circuit. The torque exerted on the actuator arm must be compensated for, either added to or subtracted from the torque created by the voice coil, when performing a seek operation. This compensation is complicated by the fact that the torque exerted on the actuator by the flex circuit varies with the position of the actuator.

Various types of locking (or latch) devices have been used to lock the arm of a voice coil in a particular position when the disk drive is not operating. The trend in latch devices is to utilize a high power unit which is separately assembled to provide reliability. However, high power latch devices generate a large amount of heat which is not desirable in a disk drive or any other area in a computer. Further, the operation of conventional latch devices can be position dependent. Thus, the orientation of the disk drive and the computer in which the disk drive is installed could effect the reliability of the latch device. Such a positional dependence of reliability is not satisfactory for portable computers.

SUMMARY OF THE INVENTION

It is, therefore, an object of the present invention to provide a disk drive having a low height and a low weight.

A further object of the present invention is to provide a multiple platter (disk), disk drive having a one inch height form factor.

Another object of the present invention is to provide a disk drive which is resistant to damage from physical shocks.

Another object of the present invention is to provide a low height disk drive having an increased data storage capacity.

Another object of the present invention is to provide a disk drive in which any mechanical off tracking of the heads is mechanically minimized and electronically corrected.

Another object of the present invention is to provide a disk drive assembly in which a single electrical connector transfers all electrical currents and data signals from the environment in which the disks reside to the exterior of the environment, and in which a header which communicates those electrical signals through the base plate is the only communication between the interior and exterior of the drive.

These and other objects of the present invention are provided by a disk drive, including: a head-disk assembly, having a base having a top and a bottom, storage means, supported on said top of said base, for storing data, solid storage means comprising two disks, interactive means for reading information from and writing information on said disks, actuator means, supported on said base and responsive to control signals, for selectively positioning said interactive means with respect to said disks means, and a cover sealably attached to said base to enclose said disks, said interactive means, and said actuator means; and control means, mounted on said head-disk assembly so that said control means is adjacent to said bottom of said base, for generating control signals to control said actuator means and for providing information signals to and receiving information signals from said interactive means, said head-disk assembly and said control means having an overall maximum height of approximately one inch (1").

A specific advantage of the present invention is that the disk drive has a reduced height with respect to conventional disk drives utilizing disks of approximately the same diameter. In particular, the three and one-half inch (3.5") single platter and multiple platter drives of the present invention have an overall height of one inch (1"). Furthermore, the disk drive of the present invention is light in weight—the drives of the present invention weighs slightly more than one pound.

A further advantage of the present invention is that a single electrical connector (header) transfers all electrical signals between the exterior and the interior of the casing, thereby reducing the possibility of the introduction of contaminants to the controlled environment within the casing. Importantly, the disk drive of the present invention does not require a breather filter.

A further advantage of the present invention is that the disk drive assembly is resistant to damages caused by physical shock and vibration.

A further advantage of the present invention is that the small number of mechanical parts reduces the possibility of breakdowns due to mechanical failures.

BRIEF DESCRIPTION OF THE DRAWINGS

FIGS. 1–7 illustrate a first embodiment of the disk drive of the present invention. In particular:

FIG. 1 is an isometric view of the first embodiment of a disk drive according to the present invention;

FIG. 2 is an isometric view of the first embodiment of the disk drive of the present invention with the cover removed;

FIG. 3 is a cross-sectional view along line 3—3' of FIG. 2;

FIG. 4 is an exploded view of the first embodiment of the disk drive of the present invention;

FIG. 5 is an end view of the first embodiment of the disk drive of the present invention;

FIG. 6 illustrates the actuator assembly; and

FIG. 7 illustrates the latch mechanism.

FIG. 8 is an isometric view of the second embodiment of a disk drive according to the present invention with the cover removed;

FIG. 9 is an exploded isometric view of the second embodiment of the disk drive of the present invention;

FIG. 10 is an exploded, isometric, bottom view of the printed circuit board and the base of the second embodiment of a disk drive according to the present invention;

FIG. 11 is an end view of the second embodiment of a disk drive according to the present invention;

DESCRIPTION OF THE PREFERRED EMBODIMENTS

Figure 8:
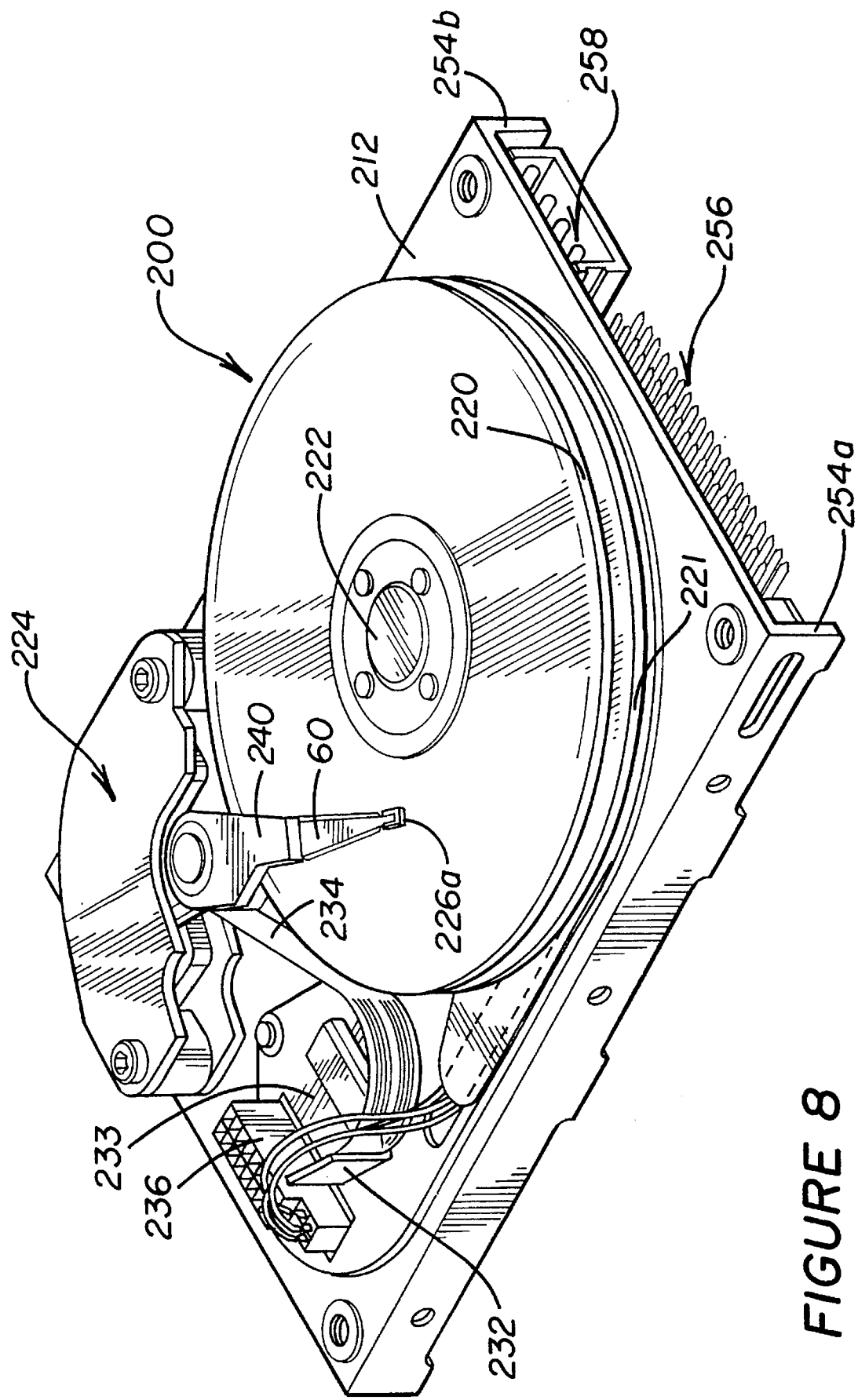
FIG. 8–11 illustrate a second embodiment of the disk drive of the present invention. In particular.

Disk drives according to the present invention will be described with reference to FIGS. 1–12. The disk drives described herein include, for example, one or two hard disks with a magnetic coating and utilize Winchester technology; however, the disk drive of the present invention may utilize various numbers of disks and other types of disks, for example, optical disks, and other read/write technologies, for example, lasers. The diameter of the disks utilized in the disk drive of the present invention have a diameter on the order of 3.75 inches, or so-called "3½ inch" disks; the disk drive of the present invention can be implemented with disks of other diameters whether larger or smaller than 3.75 inches.

A disk drive in accordance with either the first or second embodiments of the present invention has the following outline dimensions: Height 1.0" (2.54 cm); Length 5.75" (14.61 cm); and Width 4.0" (10.16 cm). The total weight is slightly over one (1) pound for the first embodiment, and 1.3 lbs (0.59 kg) for the second embodiment. Thus, the disk drive of the present invention is one-half (½) of the size of a one-half (½) height 5¼" inch disk drive. Importantly, the disk drive of the present invention weighs approximately ⅓ to ½ of the weight of standard 3½" disk drives of 20 Mb capacity. Even greater proportional reductions are provided when the first embodiment is formatted for 40 Mb capacity, and the second embodiment is formatted for 120 Mb capacity, without any change in size or weight.

FIG. 1 shows the disk drive of the present invention as assembled. Although not to scale, FIG. 1 illustrates the relationship between the length, width, and height of the disk drive, and thus low profile of the disk drive. In particular, the height "H" of the disk drive of the present invention is one inch (1").

First Embodiment and Common Features

One feature of the first embodiment which provides the low height of the drive is the sloped profile of base plate 12 and cover 14. The sloped profile provides extra vertical space below base plate 12 at the first end 10a of the disk drive and provides extra vertical space between base plate 12 and cover 14 at the second end 10b of the disk drive 10. If the sloped profile were not provided, the amount of space allocated above and below base plate 12 would be the maximum amount of space provided at the respective first and second ends 10a, 10b of the disk drive 107 accordingly, the overall height of the disk drive would be increased. The cover 14 is sealably attached to base plate 12 to provide a controlled environment between base plate 12 and cover 14. A gasket 16 (FIG. 4) between base plate 12 and cover 14 provides the seal. The ability to provide a controlled environment alleviates the need for a breather filter and allows the disk drive of the present invention to use an internal air filtration system. The seal provided by gasket 16 is stable, during operation of the disk drive, at pressures experienced at altitudes from 200 feet below sea level to 10,000 feet above sea level.

As shown in FIG. 2 the internal components of the disk drive are separated into three interrelated groups: disk 20 and spin motor 22, actuator assembly 24 for positioning heads 26 with respect to disk 20, and header assembly 28 including header 30, bracket 32, reverse flex circuit 34 and coil 36 for pivoting latch arm 38.

Actuator assembly 24 includes pivotable actuator arm 40, heads 26 (FIG. 4) mounted at a first end of actuator arm 40, an actuator coil 42 mounted at a second end of actuator arm 40 on the opposite side of the pivot point from the first end of the actuator arm, and a magnet structure 44. Magnet structure 44 supports magnets 46 (FIG. 4) and its components, as described in detail below, are formed of magnetically permeable material to provide returns for the magnetic fields generated by magnets 46. The magnet structure 44 and actuator coil 42 are arranged so that a current in coil 42 passes through the magnetic fields created by magnets 46 to create a force which pivots actuator arm 40. Currents passing in opposite directions of coil 42 create torques in opposite directions and pivot actuator arm 40 to position heads 26 at all locations between and including inside and outside diameters 48 and 50 of disk 20.

In a conventional disk drive utilizing a voice coil, a flex circuit is provided in the region between header 30 and actuator arm 40. Reverse flex circuit 34 curves toward the disk, thereby allowing latch coil 36 to be placed between header 30 and actuator arm 40.

A printed circuit assembly (or control means) 52 is attached to the bottom of base plate 12. Header 30 carries all of the electrical signals from the printed circuit assembly 52 to the controlled environment between base plate 12 and cover 14. Header 30 has a minimum number of pins due to the fact that a DC motor requiring only three (3) leads is utilized. Such a motor is described in U.S. Pat. No. 4,876,491, entitled METHOD AND APPARATUS FOR BRUSHLESS DC MOTOR SPEED CONTROL, filed Jul. 1, 1986, inventors John P. Squires and Louis J. Shrinkle, assigned to the Assignee of the subject application.

The structure of the disk drive 10 of the present invention which provides the disk drive with a low overall height will be described with reference to FIG. 3, which is a cross-sectional view along line 3—3' in FIG. 2, and FIG. 5. As show in FIG. 5, base plate 12 includes two rails 54a and 54b at first and second sides 12c and 12d of base plate 12. Rails 54a and 54b are constructed so that the mounting surface 12e of the base plate 12 sits at an angle with respect to the plane of the surface on which rails 54a and 54b rest. This angled relationship of base plate 12 and the support surface provides more room below base plate 12 at the first end 12a of the base plate than at the second end 12b of the base plate. Only a small amount of space is necessary for printed circuit assembly 52, including the components mounted thereon; however, it is necessary to provide a connector 56 and a power plug 58 on printed circuit assembly at the first end 12a of base plate 12, both of which require more space than the printed circuit assembly 52. The slope of base plate 12 provides the necessary vertical space for connector 56 and power plug 58 beneath the first end of the base plate 12a. Connector 56 provides an interface between the printed circuit assembly 52 and a host computer (not shown) and power plug 58 provides an interface between printed circuit assembly 52 and an external power source (not shown).

Conversely, disk 20 is the only component located above the first end of the base plate 12a, whereas the actuator assembly 24 is located above the second end of the base plate 12b. Actuator assembly 24 requires more vertical space than disk 20 and the slope of base plate 12 provides more space above the second end of the base plate 12b than above the first end of the base plate 12a in order to accommodate the actuator assembly 24. As shown in FIG. 1 the portion of cover 14 which meets with base plate 12 has an angle which corresponds to the angle of the base plate, and thus the top of the cover 14 is parallel with the support surface. Therefore, even though the base plate is sloped, the profile of the disk drive 10 is a rectangle as opposed to a parallelogram.

Disk 20 lies in a plane which is parallel to the support surface and which forms an angle with the plane of base plate 12. All of the support points on the mounting surface 12e of base plate 12 are designed so that the internal components (e.g., actuator assembly 24) lie in a plane parallel to the plane of disk 20 and the plane defined by support points 55 of rails 54a, 54b.

The structure and operation of actuator assembly 24 will be explained with reference to FIGS. 4–7. The function of the actuator assembly 24 is to position heads 26 with respect to the surfaces of disks 20 by pivoting actuator arm assembly 40. More specifically, to position the heads 26 over individual tracks on disk 20. Heads 26 are supported on actuator arm 40 by flexures 60. A bearing cartridge 62, which is fixed to the base plate 12, is inserted in actuator arm 40 to provide a pivot point. Actuator arm 40 is attached to bearing cartridge 62 by a clip ring 63. Using clip ring 63 instead of epoxy allows the bearing cartridge 62 to be tested prior to assembly and cleaned independently of the actuator arm 40. Actuator coil 42 is provided on actuator arm 40 on the opposite side of the pivot point from heads 26. Actuator arm 40, including all of the components attached thereto, is precisely balanced, i.e., equal amounts of weight are provided on either side of the pivot point so that the positioning of heads 26 is less susceptible to linear shock and vibration.

The force utilized to pivot arm assembly 40 is provided by a voice coil assembly. The voice coil assembly includes actuator coil 42 and magnet structure 44. Magnet structure 44 comprises top and bottom plates 64, 66 formed of magnetically permeable material, support posts 68, 70 also formed of magnetically permeable material, and first and second magnets 46a, b attached to the top plate 64. Top and bottom plates 64, 66 in conjunction with support posts 68, 70 function as returns for the magnetic fields provided by first and second magnets 46a, b. It is important that there are no air gaps between support posts 68, 70 and either the top or bottom plate 64, 66; any air gap would create a discontinuity in the return, greatly reducing the strength of the magnetic field.

First and second magnets 46a, b have opposite poles attached to top plate 64 (e.g., the south pole of first magnet 46a and the north pole of second magnet 46b are attached to top plate 64) to provide first and second magnetic fields $\vec{B}_1$, $\vec{B}_2$ between respective ones of the first and second magnets 46a, b and bottom plate 66. First and second magnetic fields $\vec{B}_1$, $\vec{B}_2$ are encompassed in three closed magnetic field loops. The first closed magnetic field loop extends between the first magnet 46a and bottom plate 66 and passes through a return provided by bottom plate 66, first support 68, and top plate 64. The second closed magnetic loop passes from first magnet 46a to bottom plate 66, through bottom plate 66 and between bottom plate 66 and second magnet 46b, and from second magnet 46b to first magnet 46a via top plate 64. The third closed magnetic loop extends between bottom plate 66 and second magnet 46b and passes through a return provided by top plate 64, second support 70, and bottom plate 66. By containing the magnetic fields $\vec{B}_1$ and $\vec{B}_2$, in returns, the magnetic field intensity of each field is increased in the region between the respective first and second magnets 46a, b and bottom plate 66; the strength of the magnetic field in this region is directly related to the torque which the voice coil exerts on the actuator arm 40, and thus the rotational velocity of actuator 40 and the seek times for the drive.

Actuator coil 42 is positioned so that it carries a current in opposite directions in first and second magnetic fields $\vec{B}_1$ and $\vec{B}_2$.

The force on a current carrying wire in a magnetic field is proportional to the magnetic field intensity, and is expressed by the equation $\vec{F} = id\vec{l} \times \vec{B}$, where $\vec{F}$ is the force, i is the current, $\vec{l}$ is the length of the wire, and $\vec{B}$ is the magnetic field. Passing a current in opposite directions in actuator coil 42 provides respective forces $\vec{F}_1$ and $\vec{F}_2$ (FIG. 2); these forces $\vec{F}_1$ and $\vec{F}_2$ pivot actuator arm 40 in opposite directions.

Crash stops are provided to limit the pivoting movement of actuator arm 40 so that heads 26 travel only between selected inside and outside diameters 48, 50 of disk 20. An outside diameter crash stop is provided by a sleeve 76 (FIG. 5) fitted on support post 68. When the pivoting motion of actuator arm 40 places heads 26 at the outside diameter 50 of disk 20 a portion of the actuator arm 40 contacts outside diameter crash stop 76, thereby preventing further movement of the heads 26. An inside diameter crash stop is provided by the portion of the latch mechanism (FIG. 7) and is described below.

Reverse flex circuit 34 for carrying electrical signals from header 30 to heads 26 and actuator assembly 24 will be described with reference to FIGS. 2, 4, 6 and 7. The reverse flex circuit is separated into three portions. A first portion 80 carries current to actuator coil 42. A second portion 82 is a ground plane which separates the current carrying portion 80 from a third data carrying portion 84. The data carrying portion 84 provides signals to heads 26 for recording information on disk 20 and carries signals from the heads 26 to the printed circuit assembly 52, via header 30, when reading data from disk 20. Interference with the relatively weak data signals which would otherwise be caused by the larger currents necessary for actuator coil 42 passing through the first portion 80 of the reverse flex circuit 34 is prevented by the provision of ground plane 82.

The reverse flex circuit 34 is electrically connected to pins 31a of header 30; however, pins 31a also serve to position the reverse flex circuit 34. In particular, bracket 32 supports reverse flex circuit 34 and latch coil 36. Bracket 32 is attached to base plate 12 by a single attachment point 86 and is rotationally positioned by the engagement of reverse flex circuit 34 and pins 31a—the positioning of latch coil 36 being important to the operation of the latch mechanism as described below. A stiffener 88 is attached to reverse flex circuit 34 in the area where it engages pins 31a and is attached to bracket 32 to provide the rigidity necessary to rotationally position bracket 32, and to facilitate engagement of reverse flex circuit 34 and pins 31a. Reverse flex circuit 34 is parallel to the plane of base plane 12 in the region of header 31 but passes through a bend of approximately 90 degrees so that it forms the loop which extends towards disk 20 and connects header 30 to actuator assembly 24.

First portion 80 of reverse flex circuit 34 terminates at the point where reverse flex circuit 34 joins actuator arm 40; however, the second and third portions 82 and 84 wrap around a shoulder 90 of actuator arm 40 which surrounds bearing cartridge 62. Wrapping the second and third portions 82 and 84 of reverse flex circuit 34 around shoulder 90 provides access to current-carrying wires are provided on the side of the flex circuit which faces the base plate in the region where reverse flex circuit 34 engages pins 31a of header 30, and thus on the inside of the curved portion of reverse flex circuit 34 extending from bracket 32 to actuator arm 40. As the first and second portions 82 and 84 wrap around shoulder 90, the side of reverse flex circuit 34 on which the current-carrying wires are provided is exposed at the end of reverse flex circuit 34, facilitating the attachment of wires 91 which connect heads 26 to reverse flex circuit 34. If wires 91 were to be connected to reverse flex circuit 34 at the point where reverse flex circuit 34 first contacts actuator arm 40, it would be necessary to wrap wires 90 around reverse flex circuit 34 or to provide connections through the reverse flex circuit 34—both being more complex and less desirable manners of providing electrical connections between wires 91 and reverse flex circuit 34. Any torque exerted on actuator arm 40 by any means other than the voice coil assembly affects the function of actuator assembly 24 in positioning heads 26 with respect to disk 20, particularly the track following any seek functions described in the above-referenced applications entitled DISK DRIVE SOFTWARE SYSTEM ARCHITECTURE and DISK DRIVE SOFTWARE SYSTEM ARCHITECTURE UTILIZING IMBEDDED REAL TIME DIAGNOSTIC MONITOR. The force provided by the voice coil assembly must be controlled to compensate for the force exerted by the reverse flex circuit 34. Accordingly, the radius R (FIG. 7) of the curve in reverse flex circuit 34 is made as large as possible to minimize the torque exerted on actuator arm 40 by reverse flex circuit 34. Indeed, the radius of the curve in reverse flex circuit 34 is approximately twice as large as the radius in the curve of a conventional flex circuit. In addition, the reverse flex circuit 34 moves in an essentially linear manner when actuator arm 40 rotates, whereas a conventional reverse flex circuit must bend throughout its curve. Accordingly, the torque exerted on actuator arm 40 by reverse flex circuit is greatly reduced with respect to the torque exerted by a conventional flex circuit.

Another advantage provided by reverse flex circuit 34 is the ability to place latch coil 36 in a position where a conventional flex circuit would be located, and thus to integrate latch coil 36 with reverse flex circuit 34 and bracket 32. Separate wires from header 30 to latch coil 36 are not necessary. Further, installing this integrated group of components requires fewer steps than installing individual components. In addition, the critical positioning of latch coil 36 is provided by reverse flex circuit 34 and stiffener 88 controlling the pivotal position of bracket 32, as described above.

All connections between the sealed environment between base plate 12 and cover 14 and printed circuit assembly 52 are provided by header 30. Pins 31a, which engage reverse flex circuit 34, also engage motor wire connector 92. Pins 31b extend below base plate 12 and engage a rear entry connector (not shown) on printed circuit assembly 52. A rear entry connector is utilized because the integrated and discrete circuit components and the surface wirings are on the side of printed circuit assembly 52 facing away from base plate 12.

A latch mechanism for locking the actuator arm 40 in an orientation where heads 26 are positioned at the inside diameter 48 of disk 20, will be described with reference to FIGS. 4, 5 and 7. During power-down of the disk drive 10 control means 52 causes actuator assembly 24 to pivot the actuator arm 40 to the position where the heads 26 are at the inside diameter of the disk over a non-data area of disk 20 before the rotational speed of the disk 20 is decreased to the point where the heads 26 land on the disk 20. Thus, the heads 26 land only on the non-data area at the inside diameter of the disk 20.

The electromagnetic latch includes latch coil 36, a latch arm 38 which pivots on pivot 94 and has a finger 96 for engaging latch notch 98 in actuator arm 40, and a spring 100 for biasing the latch arm 38 to the locked position.

An electromagnet, including latch coil 36 and swivel plate 104, is used to pivot latch arm 38 to the unlocked position against the force of spring 100. Latch coil 36 includes a capture plate 106 having an outer wall 108 and a center pole 110. The outer wall 108 and center pole 110 form opposite poles of an electromagnet, and when a current is passed through a coil (not shown) the magnetic field of capture plate 106 attracts swivel plate 104; swivel plate 104 is mounted on the latch arm 38 so that it can swivel in all directions and be flush with the outer wall 108 when the swivel plate 104 is captured by the electromagnet. Contact between the entire outer wall 108 and swivel plate 104 is necessary to provide reliability in the capture and retention of the swivel plate 104. Center pole 110 of capture plate 106 is stepped so that only a small contact area exists between center pole 110 and swivel plate 104; this small contact area causes the latch coil 36 to release the swivel plate 104 when the current in the coil (not shown) is discontinued. A high DC voltage is applied to the latch coil 36 for a short time to capture the swivel plate 104. Then, the applied voltage is reduced to a small capture maintenance level. Thus, this structure is low in power consumption and heat dissipation. Further, despite the low power consumption of the latch coil 36 it is highly reliable in its capture, holding, and release of swivel plate 104.

Spring 100 is a linear spring engaging finger 96. To reduce spring travel, thereby providing a constant and larger spring force, spring 100 is terminated outside the pivot point of pivot 94.

Finger 96 also serves as the inside diameter crash stop. Finger 96 is well suited for the inside diameter crash stop because it is positioned to engage notch 98 which is at one edge of opening 102 in actuator arm 40. The abutment of finger 96 and the same edge of opening 102 when the latch is unlatched provides the inside diameter crash stop. However, the pivoting movement of latch arm 38 in moving to the latched position reduced the distance between pivot 94 and the edge of opening 102. Therefore, the actuator arm 40 pivots slightly to move the heads beyond the inside diameter 48 to a non-data area.

The above-described structure of the disk drive of the present invention provides excellent protection from shock and vibration. In particular, the disk drive will withstand nonoperating shocks of 200 g's and operating shocks, without nonrecoverable errors, of 5 g's. Nonoperating vibration of 2 g's in the range of 5–500 Hz is the specified tolerable limit. Operating vibration, without nonrecoverable data, is specified at 0.5 g's for the range of 5–500 Hz.

The disk 20 has 752 tracks per surface due to the ability of the actuator assembly 24 to operate with a track density of 1150 tracks per inch. Thus, utilizing 26 blocks per track and 512 bytes per block, the disk drive of the first embodiment has a formatted capacity of 20 MBytes. The actuator assembly 24 provides an average seek time of 28 ms and a track-to-track seek time of 7 ms. The average seek time is determined by dividing the total time required to seek between all possible ordered pairs of track addresses by the total number of ordered pairs addressed.

The assembly of the disk drive 10 of the present invention requires less steps than assembly of conventional disk drives. The spin motor 22 and disk 20 are attached to base plate 12. Then, an integrated actuator group, including actuator arm 40, bracket 32, reverse flex circuit 34, and latch coil 36, all previously assembled, is installed. Magnet structure 44 is then placed on one of its attachment points and pivoted into position so that the portion of actuator arm 40 holding actuator coil 42 extends between the top and bottom plates 64, 66 of the magnet structure 44. Latch arm 36 is then placed on its pivot point. The disk 20 is then pack written, and thereafter cover 14 is attached. Finally, printed circuit assembly 52 is attached outside of the clean room.

Second Embodiment

A disk drive 200 in accordance with the second embodiment of the present invention will be described with reference to FIGS. 8–12.

Figure 9:
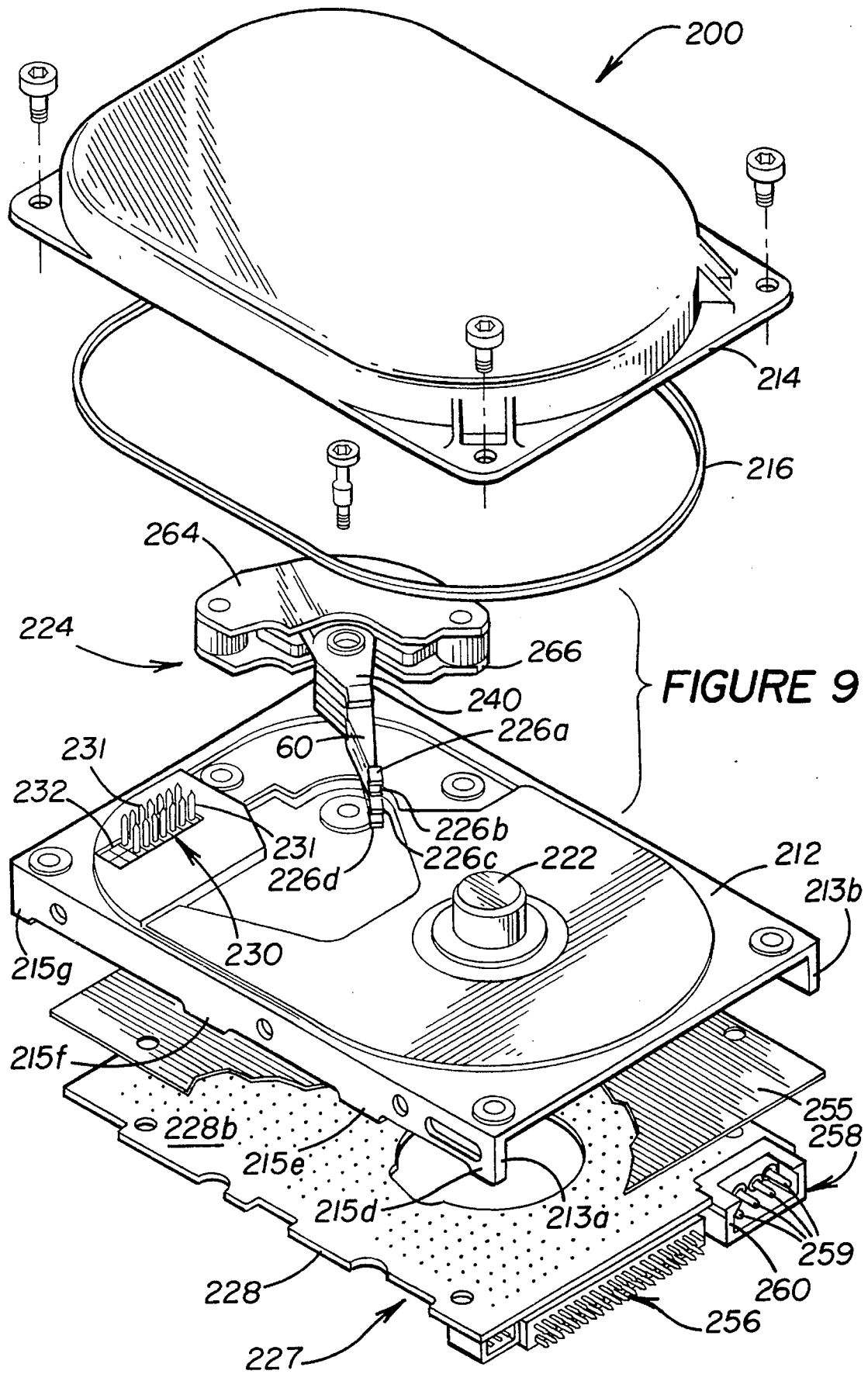
Figure 10:
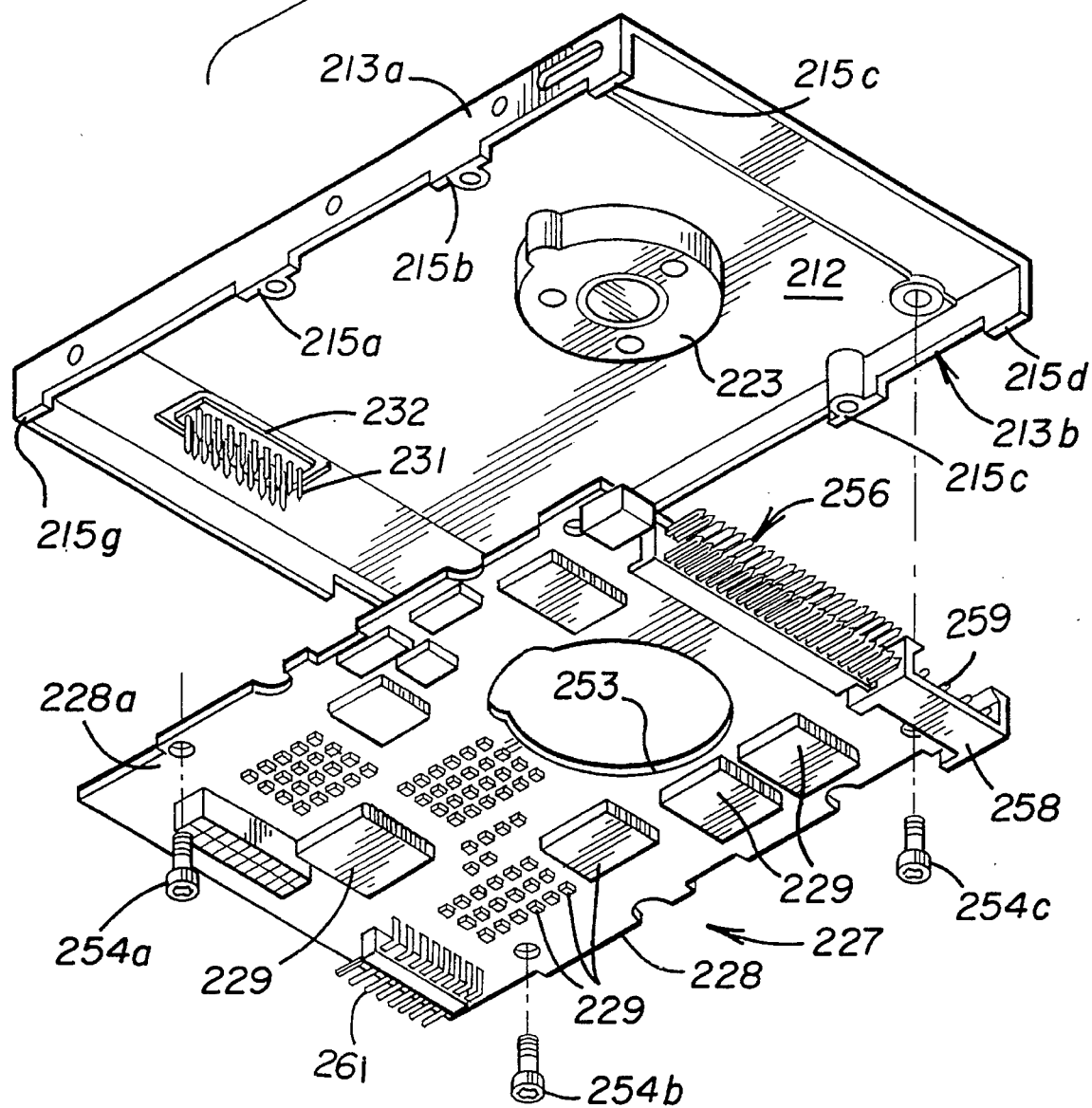

As shown in FIGS. 8–10, the construction of disk drive 200 includes a base 212 and a cover 214. Gasket 216 provides a sealed, controlled environment between base 212 and cover 214. First and second disks 220, 221 are supported on base 212 and rotated by spin motor 222. Motor 222 is mounted in a well 223 in base 212, thereby allowing lower disk 221 to be as close as possible to the top surface of base 212.

An actuator assembly 224 positions heads 226a–d with respect to disks 220 and 221; heads 226a and 226b read information from and write information to respective, opposed surfaces of disk 220, and heads 226a and 226d read information from and write information to respective, opposed surfaces of disk 221. Tables 1 and 2 below specify certain characteristics of disks 220 and 221 and heads 226a–d.

TABLE 1

| | |
|---|---|
| Number of Disks | 2 |
| Number of Data Surfaces | 4 |
| Number of Data Cylinders (Tracks per surface) | 1522 cylinders |
| Sectors per Track | 40 physical |
| | 39 accessible |
| Bytes per Sector | 662 |
| Data Bytes per Sector | 512 bytes |
| Data Capacity per Data Surface (formatted) | 30 Mbytes |
| Total Data Capacity (formatted) | 120 Mbytes |

TABLE 2

| | |
|---|---|
| Disk Diameter | 95 millimeters |
| | 3.74 inches |
| Data Track Band Width | 20.32 millimeters |
| | 0.8 inches |
| Track Density | 1850 tracks/inch |
| Bit Density (max) | 23,800 fci |

Controller 227, including printed circuit board 228 and circuitry 229 mounted on circuit board 228, provides control signals to spin motor 222 and actuator assembly 224, and provides data signals to and receives data signals from heads 226a–d. Header 230 provides all electrical connections between controller 227 and the environment between base 212 and cover 214. Header 230 comprises conductive pins 231 embedded in a plastic header 232 which is then potted in base 212. A reverse entry connector 237 mounted on the front side 228a of printed circuit board 228 receives pins 231; pins 231 pass through printed circuit board 228 to enter connector 237. Bracket 232 supports a flex circuit 233, including a reverse flex circuit loop 234, and connector 236 which provides electrical interconnections between flex circuit 233 and pins 231.

Figure 12:
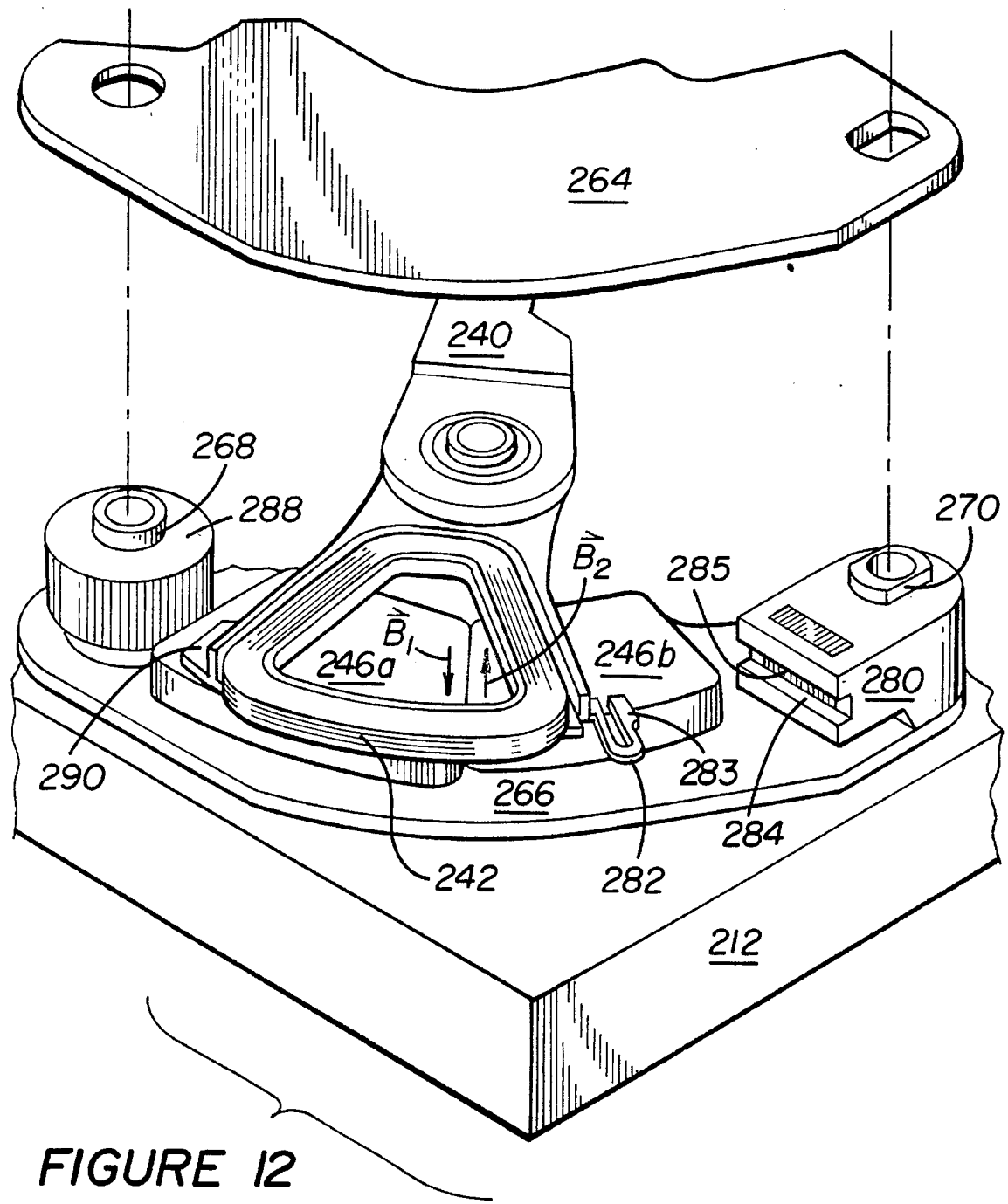
FIG. 12 is an exploded, isometric view of a portion of the actuator and the latch mechanism utilized in the second embodiment of the present invention.

With reference to FIG. 12, actuator assembly 224 includes pivotable actuator arm 240 and an actuator motor. The actuator motor is a so-called voice coil motor comprising coil 242 (provided on actuator arm 240), first and second magnets 246a, 246b, top plate 264, bottom plate 266, first support post 268, and second support post 270. Top and bottom plates 264 and 266, in conjunction with first and second support posts 268, 270 create returns for the magnetic fields provided by first and second magnets 246a and 246b. The operation on the voice coil motor is described above with respect to the first embodiment.

The structure which enables disk drives 200 of the second embodiment of the present invention to include 2 disks, 220 and 221, lying in parallel planes within a one inch height form factor disk drive will be described with reference to FIGS. 8–10. In the first embodiment of the present invention the sloped profile of base 12 allowed the use of a fully shrouded power connector 58. In particular, power connector 58 was provided at the first end 10a of disk drive 10 where the sloped profile provided more room underneath base 12 and less room between base 12 and the top of cover 14. In the second embodiment, base 212 has first and second side rails 213a and 213b, and the mounting surface of base 212 is parallel to the plane defined by support points 215a–g. The space below base 212 is the same at both ends of drive 200; in the second embodiment a sloped profile is not utilized. In comparison with the first embodiment, the uniform height of rails 213a and 213b is the same as the height to rails 54a and 54b at the second end 10b of drive 10. Accordingly, the space between base 212 and cover 214 is increased at the end of drive 200 where disks 220 and 221 reside. This increased space between base 212 and cover 214, combined with the placement of motor 222 in well 223, allows two disks 220 and 221 to be provided in substantially parallel planes.

Printed circuit board 228 is mounted to base 212 by screws 254a–c, and an insulating sheet 255 is provided between printed circuit board 228 and base 212 to prevent short circuiting of the solder points appearing on the back side 228b of printed circuit board 228 which faces base 212. Printed circuit board 228 has an opening 253, and well 223 protrudes through opening 253.

The reduced height of rails 213a and 213b at the end of drive 200 where interface connector 256 and power connector 258 reside required the removal of part of the shrouding from power connector 258. Thus, pins 259 of electrical connector 258 are not protected by shroud 260 in the region between pins 259 and base 212. However, because the connector which attaches to pins 259 is itself insulated, there is no danger of shorting pins 259 to base 212. A third connector 261, used for test purposes, is provided at the opposite end of drive 200 from connectors 256 and 258, as shown is FIG. 11.

Figure 11:
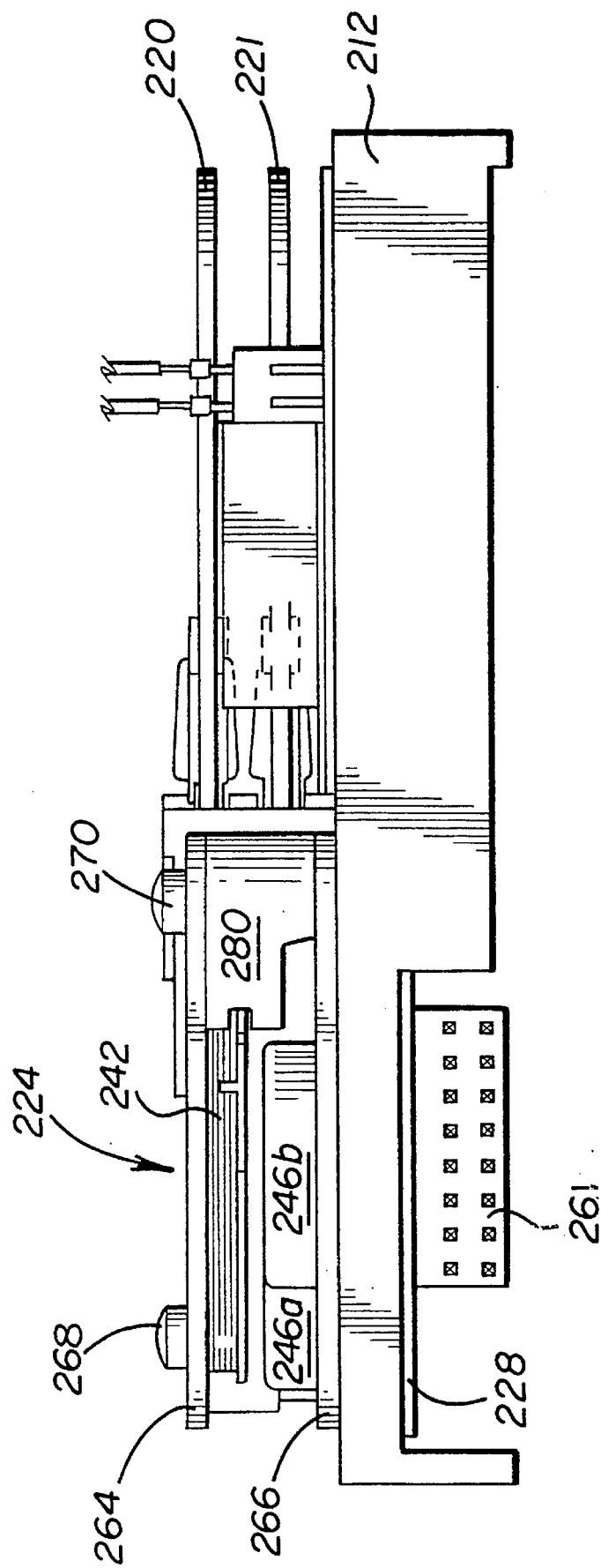

A latch mechanism for locking actuator arm 240 will be described with reference to FIGS. 11 and 12. The latch mechanism includes a magnet assembly 280 provided on second support post 270 and latch arm 282, including latch finger 283, mounted on actuator arm 240. Magnet assembly 280 has a slot 284 and contains the magnetic field provided by a magnet (not shown) so that the magnetic field affects latch finger 283 only when latch finger 283 enters slot 284. The operation of this latch assembly is described in the above-identified Application entitled MAGNETIC PARKING DEVICE FOR DISK DRIVE.

A resilient element 285 provided in slot 284 of magnet assembly 288 functions as the inside diameter crash stop. A sleeve 288 provided on first support posts 268, combined with tab 290 on actuator arm 240 function as the outside diameter crash stop.

Table 3 specifies certain performance characteristics of disk drive 200.

TABLE 3

| Seek Times | |
| --- | --- |
| Track to Track | 8 msec |
| Average | sub-19 msec |
| Maximum | 35 msec |
| Average Latency | 8.8 msec |
| Rotation Speed (±.1%) | 3399 RPM |
| Controller Overhead | 1 msec |
| Data Transfer Rate To/From Media | 1.5 MByte/sec |
| Data Transfer Rate To/From Buffer | 4.0 MByte/sec |
| Interleave | 1-to-1 |
| Buffer size | 64K byte |

All seek times are determined for nominal d.c. input voltages. Average seek times are determined by dividing the total time required to seek between all possible ordered pair of track addresses by the total number of ordered pairs.

Table 4 specifies certain environmental characteristics of disk drive 200.

TABLE 4

| Temperature | |
| --- | --- |
| Operating | 5° 1 to 55° |
| Non-operating | −40° C. to 60° C. |
| Thermal Gradient | 20° C. per hour maximum |
| Humidity | |
| Operating | 8% to 80% non-condensing |
| Non-operating | 8% to 80% non-condensing |
| Maximum Wet Bulb | 26° C. |
| Altitude (relative to sea level) | |
| Operating | −200 to 10,000 feet |
| Non-operating (max.) | 40,000 feet |

Table 5 specifies shock and vibration tolerances for disk drive 200. Shock is measured utilizing a ½ sine pulse, having a 11 msec duration, and vibration is measured utilizing a swept sine wave varying at 1 octave per minute.

TABLE 5

| Non-operating shock | 75 G's |
| --- | --- |
| Non-operating vibration | |
| 5–62 Hz | 0.020" (double amplitude) |
| 63–500 Hz | 4 G's (peak) |
| Operating shock | 5 G's (without non-recoverable errors) |

TABLE 5-continued

| Operating vibration | |
| --- | --- |
| 5–27 HZ | .025" (double amplitude) |
| 28–500 HZ | .5 G's (peak) (without non-recoverable errors) |

The many features and advantages of the disk drive of the present invention will be apparent to those skilled in the art from the Description of the Preferred Embodiments. For example, those skilled in the art will appreciate that the structure of the disk drive of the present invention as described herein can be scaled for use with disk drives having disks with smaller and larger than 3½ in. Thus, the following claims are intended to cover all modifications and equivalents falling within the scope of the invention.

I claim:

1. A disk drive responsive to a host computer, comprising:

a base, said base having a top, a bottom, a well, and first and second side rails extending from the bottom of said base;

first and second disks;

a motor, mounted in said well, for supporting and rotating said disks;

interactive means for reading information from and writing information on said disks;

actuator means, supported on the lop of said base and responsive to control signals, for selectively positioning said interactive means with respect to said disks;

a header provided in said base and having pins extending perpendicular to the bottom of said base, said pins being electrically interconnected with said interactive means;

control means, confined between said first and second side rails, for generating control signals, and for providing information signals to and receiving information signals from said interactive means via said header, said control means comprising a connector for receiving said pins;

a cover sealably attached to said top of said base to provide a controlled environment between said cover and said base for said disks, said interactive means, and said actuator means;

said control means comprises a printed circuit board having circuitry provided thereon and an opening;

said printed circuit board having a first surface facing said base and a second surface;

said connector comprises a rear entry connector mounted on said second surface of said printed circuit board; and said well protrudes through said opening in said printed circuit board.

\* \* \* \* \*

UNITED STATES PATENT AND TRADEMARK OFFICE
CERTIFICATE OF CORRECTION

PATENT NO. : 5,621,582

DATED : April 15, 1997

INVENTOR(S) : Frederick M. Stefansky

It is certified that error appears in the above-identified patent and that said Letters Patent is hereby corrected as shown below:

Column 14, line 29; delete "lop" and insert ----top----.

Signed and Sealed this

Thirteenth Day of October 1998

Attest:

BRUCE LEHMAN

Attesting Officer        Commissioner of Patents and Trademarks